3,287,138
METHOD FOR SEPARATING FLOUR FROM ADMIXTURE WITH LARGER CEREAL PARTICLES
Walter W. Pearson and Ross F. Brian, Danville, Ill., assignors to Lauhoff Grain Company, Danville, Ill., a corporation of Illinois
No Drawing. Filed Nov. 18, 1963, Ser. No. 324,180
9 Claims. (Cl. 99—93)

This invention relates to a fine flour product and to a method for producing the same. More specifically, this invention pertains to a fine flour product produced in the dry milling of corn. This flour product previously was unable to be separated from other corn kernel components and of necessity was normally disposed of in animal feeds or similar non-premium grade products having a low selling price.

In the dry milling of corn, shelled clean corn after desired preparation, such as the imparting thereto of a certain moisture content to obtain desired separation of the kernel components, is degerminated or mechanically broken down. The corn kernels are separated into their various components, namely; germ, bran, horny or hard endosperm, and flour or soft endosperm. Methods for effecting basic separations of the foregoing elements of corn kernels following degermination are well known in the dry corn milling industry.

Normally, approximately two pounds of flour or soft endosperm is readily obtainable as a coarse corn flour which is 65–75% through an 80 mesh screen. This flour may be readily ground to a flour which is 99% through a 100 mesh screen, 95% through a 200 mesh screen and 85% through a 325 mesh screen. If an additional yield of fine corn flour is desired, a mixture of soft and hard endosperm in the form of fine grits must be ground into flour.

Reduction of the fine corn grit product is effected by means of devices such as mills, grinders, rolls and the like. Flour obtained by the latter technique is somewhat different from that obtained solely from the floury endosperm of the corn kernels, as evidenced by differences in gel temperatures of the two flours. The gelatinization temperature of the starch of the floury endosperm is lower than that of the flour made from the hard endosperm. It is desirable in many instances to employ a starch material having a low gelatinization point to facilitate the cooking operation. The lower the "gel" point the faster the starch cooks with resulting savings in both time and heat input.

For example, in the use of starch adhesives in corrugating pastes, caustic soda is added to the employed starch suspensions to lower the gelatinization temperature of the adhesives. The lowered gel temperature enables the starch to be cooked in situ on the high speed corrugating flutes of modern corrugating machines. Obviously, if a starch material were available with an inherent low gel temperature, less of the costly and corrosive caustic soda would be required for use in the corrugating apparatus.

The starch of the flour recovered in accordance with the process steps hereinafter set forth has an extremely low gel temperature making it particularly desirable for utilization in those applications in which low gel temperatures are desired.

During the degerminating step, attrition type apparatus well known in the art mechanically breaks down the corn kernels. However, in the course of effecting the kernel breakdown and subsequent particle separation, some of the kernel endosperm is finely divided and adheres to larger grit particles because of surface oil disposed on the grit particles. This oil originates in the germ of the kernel, which is approximately 20% oil by weight and is broken free from the remaining portions of the kernel in the course of degermination.

The endosperm portion from the degerminator which is retained on screens of from 16 to 50 mesh is generally utilized as a corn grit product. The finer grit portion passing through the 16 to 50 mesh screens is normally sold as animal feed.

This grit product, having corn oil disposed on the surface thereof and flour particles adhering thereto, is generally known as a "fine through stock" and contains as much as one-third by weight of finely divided corn flour. Heretofore there has been no practical way to recover the fine flour product from the fine through stock because of the adhesive action of the surface corn oil. Consequently, attempted separations of the fine flour product by screening or aspiration resulted in meager recoveries, usually less than 5%.

The fine endosperm flour of the fine through stock has a much greater value when separated than when comprising a portion of the oil-containing fine through stock. The fine flour which adheres to the grit surfaces because of the surface corn oil is less than 100 mesh in particle size and is 80+% through a 325 mesh screen. Because of its fineness no size reduction steps need be performed on it, after the same is recovered, for sales purposes.

It is an object of this invention to provide a method for substantially completely recovering a valuable fine flour product which heretofore was normally sold as a component in a cheap animal feed.

It is another object of this invention to provide an efficient method for separating a fine flour product from a larger grit product to which adhering by means of surface oil. The separation is effected by means of a liquid solvent-carrier stream that concomitantly dissolves the oil adhesive and carries the fine flour product from the vicinity of the larger grits to which initially attached.

It is still another object of this invention to provide a flexible method for recovery of fine flour from a grit product to which adhering by means of surface oil which may utilize any of a number of separating techniques, such as elutriation and the use of centrifugal force.

The above and other objects of this invention will become more apparent from the following detailed description and appended claims.

In one embodiment of this invention a "fine through stock" or endosperm product stream discharged from a corn kernel degerminator is placed in a contact zone. The corn product which is generally smaller than 16 mesh in particle size has added thereto a corn oil solvent such as hexane; the resulting mixture is thoroughly agitated. The agitated mixture is left quiescent to permit settling of the heavier grit particles, after which the cloudy supernatant liquid comprising fine flour dispersed in a solution or miscella of corn oil and solvent is decanted and filtered to separate out the solids. The filtered solids are washed with fresh hexane to free them of occluded oil, and then air dried. The recovered solids comprise a fine flour of less than 100 mesh.

It will be noted that the effectiveness of the oil solvent of the process above set forth does not rely upon the extraction of oil from the grit-flour agglomerates. The oil solvent of the process presented performs a "washing" function by removing the oil from the grit surfaces and incorporating the same in an oil-solvent miscella, thereby enabling the flour to separate from the heavier grits and be readily removed in the miscella.

The fine through stock product may also have the fine flour separated from the grits by screening and centrifuging methods as will hereinafter be explained in greater detail.

In accordance with this invention, the recovery of fine flour of less than 100 mesh (all mesh sizes referred to herein are U.S. standard mesh sizes) is effected by destroying the adhesive ability of surface oil in a fine through stock obtained in the dry milling of corn. Simultaneously with the destroying of the adhesive property of the oil, the fine flour is separated from the larger grit particles. The means disrupting the adhesive property of the oil may be an oil solvent, such as hexane, which dissolves the oil to form a miscella. After the flour has separated from the larger and heavier grit particles, a number of separating techniques may be employed whereby the flour is separated from the grits in the medium which also destroyed the bond between the flour and grits.

The process steps hereinafter disclosed enable an additional one-half to five pounds of flour to be available per bushel of corn. The additional flour recovery of this invention thus increases the flour yield of a bushel of corn up to 100% above that quantity normally recovered.

In subjoined Table 1 the results obtained from the sedimentation elutriation of seven samples of a fine through stock are set forth. The samples were processed in accordance with the following steps. The individual samples were placed in a two-liter graduate and filled with a mixture of corn oil and hexane containing 30% by weight oil which was heated to 130° F. The solids-liquid mixture was thoroughly agitated by means of a No. 11 rubber stopper suspended from a wire. The agitated mixture was allowed to settle for the periods of time indicated in the table, after which the supernatant liquid comprising a cloudy mixture of fine flour and an oil-hexane solution was filtered onto a #50 Whatman paper.

The filtered flour solids were washed with fresh hexane so that any occluded oil was removed. The washed solids were air dried and found to comprise a fine flour product that was substantially all −100 mesh in particle size. The amount of −100 mesh corn flour available was found by continuing the elutriations until a clear supernatant was recovered.

bed of fine through stock as evidenced by the following example.

Example 1

Fine through stock from the dry milling of corn was air dried to 12% moisture content. Twelve pounds of this material were placed in a four inch diameter vertical column. Hexane at a temperature of 140° F. was passed upwards through the bed of fine through stock at an average rate of 9.9 inches per minute and allowed to overflow from the column to a receiver. Washing with hexane was continued until the overflow was clear. The hexane-solids mixture that overflowed the column was allowed to settle and the solids were separated from the liquid. The solids were air dried and found to comprise a corn flour product of essentially −100 mesh particle size. A total of 26.8% of the fine through stock charged to the column was recovered as a corn flour product with the following analysis:

|   |   | Particle size screen analysis, percent |
|---|---|---|
| Moisture, 8.70% | | On U.S. #100 mesh, 0.32%. |
| Protein, 8.14% | | On U.S. #200 mesh, 4.39%. |
| Fat, .08% | | On U.S. #325 mesh, 14.54%. |
| Fiber, .97%. | | |
| Ash, 1.58% | | Through U.S. #325 mesh, 80.75%. |
| Nitrogen free extract, 80.53%. | | |

The principles of this invention are also applicable to a countercurrent elutriation method in which a fine through stock is continuously passed countercurrently to an oil-solvent stream. In the method of Example 2 the oil-solvent miscella removes the flour particles from the larger grits. Thus the solvent stream not only serves to dissolve the oil adhesive retaining the flour to the larger grits, but in addition serves as the carrier which continuously

TABLE 1

| Run No | 1 | 2 | 3 | 4 | 5 | 6 | 7 |
|---|---|---|---|---|---|---|---|
| Fine through stock feed, grams | 230 | 230 | 345 | 460 | 400 | 345 | 345 |
| Average settling time, seconds | 55 | 45 | 46 | 66 | 42 | 52 | 50.5 |
| Average settling rate, inches per minute | 16.4 | 19.5 | 18.2 | 12.8 | 17.4 | 18.0 | 16.5 |
| −100 mesh corn flour in feed, percent of feed | 31.7 | 28.4 | 25.3 | 26.1 | 25.9 | 40.9 | 26 |
| −100 mesh corn flour recovered, percent of available | 76.8 | 83.9 | 90.0 | 67.1 | 73.5 | 95.3 | 91.0 |

The flexibility permissible in the process above described relative to Table 1 is apparent from subjoined Table 2, wherein a number of various solvents are set forth. These solvents were employed in sedimentation elutriations employing the process steps and apparatus of Table 1 in which the settling times and rates were allowed to vary as indicated.

removes the flour from the contact zone leaving the larger and heavier grit particles behind.

Example 2

Fine through stock from the dry milling of corn containing 12.5% moisture and 7.86% fat on a moisture-free basis was fed continually in the top of a 5½ inch

TABLE 2

| Solvent Used | Test No. | | | | | |
|---|---|---|---|---|---|---|
|  | 1 | 2 | 3 | 4 | 5 | 6 |
|  | Acetone | Benzene | Benzaldehyde | Butanol | Ethyl Ether | Mineral Spirits |
| Percent oil in solvent carrier original concentration | 0 | 0 | 0 | 0 | 0 | 0 |
| Fine through stock feed, grams | 345 | 345 | 345 | 345 | 345 | 345 |
| Average settling time, seconds | 60.5 | 71.5 | 131 | 129 | 29 | 68 |
| Average settling rate, inches per minute | 13.7 | 15.5 | 29.5 | 31.7 | 9.1 | 15.1 |
| −100 Mesh corn flour in feed, percent of feed | 29.6 | 29.6 | 29.6 | 29.6 | 29.6 | 29.6 |
| −100 Mesh corn flour recovered, percent of available | 66.3 | 64.2 | 79.1 | 80.9 | 70.2 | 66.2 |

The basic process steps of this invention are also applicable to an elutriation system wherein the hexane, heptane or other oil solvent is passed through a stationary diameter column, 40 inches in height. An agitator continuously mixed the column contents comprising the fine through stock which moved countercurrently to a flow of 1,200 grams per minute of hexane entering the bottom of the column so as to maintain a solids content in the column of 17.5%. A total of 39.2 pounds of fine through stock was fed to the column countercurrently to 185 pounds of hexane at 70° F. The mixture of liquid-solids was allowed to overflow the column and was collected in a receiver.

During the continuous washing of the fine through stock, the coarser particles settled to the bottom of the column and were continuously withdrawn at such a rate as to maintain a loose bed in the column of approximately 30 inches in depth.

The corn flour product solids in the overflow were separated from the liquid, air dried, weighed, and found to weigh 10.6 pounds and be substantially all −100 mesh. This recovery of corn flour product was found to comprise 79.8% of the −100 mesh corn flour product available which was determined by exhaustive countercurrent washing of the feed material with hexane.

In addition to the above methods of separating flour from grits which have surface oil thereon, the following screening process of Example 3 may be employed.

*Example 3*

Fine through stock from the dry milling of corn was air dried. A 50 gram sample was slurried with 75 grams of hexane and placed on a 16 mesh screen and washed with 25 grams of hexane. The material passing the 16 mesh screen was recovered on a 20 mesh screen and washed with 50 grams of solvent previously recovered. The material passing the 20 mesh screen was recovered on a 30 mesh screen and washed with 50 grams of solvent previously recovered. The material passing the 30 mesh screen was recovered on a 60 mesh screen and washed with 50 grams of solvent previously recovered. The material passing the 60 mesh screen was recovered on an 80 mesh screen and washed with 50 grams of solvent previously recovered. The material passing the 80 mesh screen was recovered on a 100 mesh screen and washed with 50 grams of solvent previously recovered. The corn flour product material passing the 100 mesh screen was recovered from the aggregate of solvent and found to comprise 40% of the initial 50 gram sample, after air drying for solvent removal.

A fourth method which may be employed for separating fine flour particles from larger grit particles in a fine through stock utilizes centrifugal separation.

*Example 4*

Fine through stock from the dry milling of corn was mixed with hexane to comprise a 20% solids slurry. The slurry was placed in four graduated 15 milliliter centrifuge tubes and rotated at 4,000 revolutions per minute at an average radius of 3 inches (average radius of the center of mass of the centrifuged material) for ten minutes. The volume of fine material in the graduated tube was determined to be 26.5% of the total solid material in the tube. After carefully decanting the liquid from the tube the fines layer was removed from the tube, air dried, and weighed. Approximately 8.1 grams of −100 mesh corn flour product was recovered comprising 90% of the −100 mesh flour in the fine through stock.

The foregoing methods of separation are indicative of the great flexibility which the inventive principles herein disclosed possess. It has been found that a fine flour product which had heretofore been disposed of as a component in a cheap cattle feed may be recovered and sold at premium prices by the expedient of readily separating the same from larger grit particles in a fine through stock.

It has also been found that in the course of producing a fine through stock, an oil originating in the germ of the corn kernel, which kernel is being mechanically torn apart into its basic components, serves as a binder or adhesive which secures the flour particles to the grit surfaces. By contacting the fine through stock comprising fine flour, grits and oil with an oil solvent, the oil adhesive is dissolved in the solvent whereafter the fine flour may be readily separated from the heavier grits by means of the various mechanisms previously discussed in the examples.

The recovered fine flour is a premium product and may be used as a dusting powder between metal sheets, an ingredient in gypsum compositions, as well as an edible flour having a long shelf life. The low gel temperature of the flour starch renders it especially suitable for those applications in which such property is desired, as above indicated.

It will be noted that the oil solvent, which may be hexane, heptane, various alcohols, methylpentane, chlorine derivatives of ethane, as well as other well known solvents for vegetable oils, is not intended to extract oil from the grits and flour of the fine through stock. The solvent merely dissolves the surface oil securing the flour to the grits so that the bond between the flour and grits is destroyed. The grit and flour portions of the fine through stock have their origin in the endosperm portion of the corn kernels and, accordingly, have substantially no oil content.

The solvent is operable over a broad range of temperatures. The upper temperature is dictated by the solvent or miscella boiling point, and the lower temperature by the dissolving abilities of this solvent or miscella at such temperatures. Obviously the optimum operating temperature range varies with the solvent. Hexane is operable at temperatures as low as 50° F. and hexane-oil miscellas are operable at temperatures as high as 175° F. Superatmospheric pressures will, of course, increase the maximum operating temperature.

The oil which serves to bond the flour and grit together comprises that oil picked up by the grit surfaces in the degermination operation from the germ portion of the corn kernels.

The quantity of solvent to be employed in the process above disclosed will again depend upon its ability to dissolve the oil and the specific mode of contact employed. The ability to ascertain the proper amount of solvent is believed to be well within the skill of the art. Obviously the solvent employed to eliminate the adhesive property of the oil should be inert to the flour and grits. Preferably the solids content of a solvent or solvent-oil-fine through stock mixture should be within the range of 15–45%, although solids contents outside this range are workable.

After the oil adhesive has been dissolved, the differences in particle size between the grits and the fine flour, which is substantially all −100 mesh in size, may be employed for effecting separation between the flour and the grits. As above indicated, the heavier grit particles will settle in a liquid medium at a faster rate than the fine flour particles. Accordingly, by passing the solvent stream through the fine through stock, the oil adhesive which enables the flour to adhere to the grits, is dissolved. Simultaneously, if the stream is fed through the contact zone, the velocity of the stream may be regulated so that the lighter flour particles are carried off, whereas the heavier grit particles will not be carried off. Thus, the velocity of the solvent stream may be adjusted so that it lies between the settling rates of the grits and the flour. The slower moving flour particles will be carried away with the solvent stream, whereas the faster-settling heavier grit particle will descend in the solvent stream and collect in the contact chamber. The difference in particle size also makes possible an efficient separation by centrifugal force and renders workable both the sedimentation and countercurrent-stream forms of elutriation.

Although the rate of oil solution in an oil-solvent solution or miscella decreases with oil content, in order to render the above processes economical in operation, the solvent-oil solution streams normally are not processed for recovery of the oil content until the oil content therein attains a fairly high level, in the neighborhood of 40% by weight. Because of the rather small amount of oil in the fine through stock, the oil solvent employed either comprises a high-oil-content miscella or is subsequently employed in an oil extraction process which assures a high-oil-content miscella when the solvent is stripped for reuse and the corn oil recovered. The solvent employed for contacting the fine through stock and dissolving the oil bond may have an oil content from zero to about 50% and still function efficiently for purposes of simultaneously dissolving the oily bond and removing the light flour particles.

Although the foregoing description was specific to corn, it is intended that the process steps disclosed be also applicable to the recovery of other cereal flours from larger cereal fragments when retained thereto by a cereal oil adhesive. The particle size of the flour in a fine through stock may vary with varying apparatus and corn samples. The term "flour" as hereinafter employed in the claims is to be understood as material having a particle size of 100 mesh or smaller.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. A continuous method for separating corn flour of less than 100 mesh particle size from corn grits to which adhering by means of oil disposed on the surface of said grits, said flour and grits resulting from the dry milling of corn; the steps comprising continuously passing corn grits having flour adhering to surface portions thereof by surface oil disposed on the grits into a contact zone, continuously passing a stream of solvent for said oil into said contact zone, so as to dissolve substantially all of said oil contained in said contact zone thereby enabling said corn flour to separate from said corn grits, said solvent being inert to said flour and grits and adequate in amount to free said flour from said grits; allowing said corn grits to settle and accumulate in the bottom of said contact zone; continuously removing settled corn grits from the bottom of said contact zone, and continuously removing the flour from said contact zone by means of a stream of solvent continuously exiting from said contact zone at a point spaced from the area of grit accumulation.

2. A method for separating cereal flour from larger cereal particles resulting from the dry milling of cereal grain; said flour adhering to said particles by oil disposed on the surface of said larger cereal particles, comprising the steps of adding a solvent for said oil to the cereal flour-cereal particle mixture which destroys the adhesive property of the oil and is inert to the flour and larger cereal particles; said solvent being present in adequate amount to separate said cereal flour from the larger cereal particles; and separating said cereal flour from said larger cereal particles by removing said flour from said larger cereal particles in said solvent.

3. The method of claim 2 in which the cereal flour is separated from the larger cereal particles by centrifuging.

4. The method of claim 2 in which the cereal flour is separated from the larger cereal particles by allowing the larger cereal particles to settle and decanting off the cereal flour in the supernatant liquid.

5. The method of claim 2 in which the cereal flour is separated from the larger cereal particles by passing the liquid-cereal flour-cereal particle mixture through a series of screens having openings of such diminishing size that the cereal flour is separated from the larger cereal particles.

6. A method for recovering a minus 100 mesh particle from a minus 16 mesh particle, said particles resulting from the dry milling of cereal grain and adhering to each other by means of surface oil disposed on the larger particle surfaces, comprising the steps of contacting the adhering particles with a solvent for said surface oil in a contact zone, said solvent being inert to said particles and present in sufficient quantity to dissolve said oil whereby said minus 100 mesh particles and said minus 16 mesh particles separate, and flowing the solvent from said contact zone so that substantially only said minus 100 mesh particles are removed from said contact zone by said solvent.

7. A method for separating flour from admixture with larger grit particles having surface oil disposed thereon in sufficient quantity to cause particles of said flour to surface adhere to said grit particles, said particles and grits resulting from the dry milling of cereal grain, said method comprising intimately engaging the grit-flour mixture with a solvent for said oil in sufficient amount whereby the surface attraction of said flour to said grit particles is broken, said solvent being inert to said grit particles and flour; allowing the flour to separate from the grid particles while in said solvent, and removing the flour from the grit particles by means of said solvent.

8. A method for separating fine flour particles of minus 100 mesh particle size from larger grit particles which are contained in a fine through stock resulting from the dry milling of cereal grain, said particles adhering together by means of surface oil disposed at the particle interface, comprising agitating said fine through stock with a solvent for said surface oil in an amount adequate to dissolve the oil securing the flour and grit particles together; allowing the heavier grit particles to settle, and decanting off the supernatant solvent-flour mixture.

9. A method for separating fine flour particles from a fine through stock in which particles of said fine flour are adhered to larger grit particles by means of surface oil disposed at the flour-grit interface, said flour and grit particles resulting from the dry milling of cereal grain; comprising countercurrently flowing said fine through stock to a stream of solvent for purposes of dissolving the surface oil at the particle interface in a zone of contact, said solvent being inert to said flour and grit particles and present in an amount adquate to free said flour from said fine through stock; and passing the solvent stream containing said flour from the zone of contact at a rate of flow greater than the rate of settling of the fine flour but slower than the rate of settling of the grit particles.

References Cited by the Examiner

UNITED STATES PATENTS

| 780,297 | 1/1905 | Krom et al. | 209—3 |
|---|---|---|---|
| 956,381 | 4/1910 | Samuel et al. | 209—9 X |
| 1,974,808 | 9/1934 | Dietz | 99—93 |
| 2,240,442 | 4/1941 | Paul. | |
| 2,460,389 | 2/1949 | Lloyd et al. | 99—80 |
| 2,632,720 | 3/1953 | Perry | 134—25 |
| 2,686,192 | 8/1954 | Bonotto. | |
| 2,764,287 | 9/1956 | Harvengt | 209—3 X |
| 2,862,511 | 12/1958 | Forsberg | 134—25 X |
| 3,077,308 | 2/1963 | Rozsa et al. | 99—93 X |

A. LOUIS MONACELL, *Primary Examiner.*

RAYMOND N. JONES, *Examiner.*